(12) United States Patent
Pfutzner et al.

(10) Patent No.: US 11,988,088 B2
(45) Date of Patent: May 21, 2024

(54) DOWNHOLE FLOWMETER

(71) Applicant: Schlumberger Technology Corporation, Sugar Land, TX (US)

(72) Inventors: Harold Pfutzner, Richmond, TX (US); Mohammed Badri, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/307,152

(22) Filed: Apr. 26, 2023

(65) Prior Publication Data

US 2023/0258072 A1     Aug. 17, 2023

Related U.S. Application Data

(62) Division of application No. 17/059,616, filed as application No. PCT/US2019/034345 on May 29, 2019, now Pat. No. 11,680,481.

(60) Provisional application No. 62/678,474, filed on May 31, 2018.

(51) Int. Cl.
| | |
|---|---|
| *E21B 47/107* | (2012.01) |
| *G01F 1/66* | (2022.01) |
| *G01F 1/667* | (2022.01) |
| *G01F 1/7082* | (2022.01) |
| *G01F 1/712* | (2006.01) |
| *G01F 1/002* | (2022.01) |

(52) U.S. Cl.
CPC ............ *E21B 47/107* (2020.05); *G01F 1/662* (2013.01); *G01F 1/667* (2013.01); *G01F 1/7082* (2013.01); *G01F 1/712* (2013.01); *G01F 1/002* (2013.01)

(58) Field of Classification Search
CPC ........ G01F 1/662; G01F 1/667; G01F 1/7082; G01F 1/712; G01F 1/002; E21B 47/107
USPC ........................................................ 73/152.21
See application file for complete search history.

(56) References Cited

U.S. PATENT DOCUMENTS

| | | | | |
|---|---|---|---|---|
| 5,777,278 | A | * 7/1998 | Bednarczyk | .......... E21B 47/107 175/48 |
| 9,664,543 | B2 | * 5/2017 | Twerdowski | ........ G01N 29/032 |
| 2015/0260561 | A1 | 9/2015 | Twerdowski et al. | |

(Continued)

FOREIGN PATENT DOCUMENTS

| | | |
|---|---|---|
| CN | 102183269 A | 9/2011 |
| DE | 102011015677 A1 | 10/2012 |

(Continued)

OTHER PUBLICATIONS

Rosen, "Rosen EMAT Flowmeter", slideshow presentation (Year: 2017).*

(Continued)

*Primary Examiner* — Nathaniel T Woodward
(74) *Attorney, Agent, or Firm* — Jeffrey D. Frantz

(57) ABSTRACT

An intelligent completion module includes a flowmeter that uses one or more electromagnetic acoustic transducer (EMAT) sensors and a flow control valve. The flow rate and the speed of sound in the production fluid from a production zone is measured and used to make reservoir management decisions. The flowmeter includes at least two EMAT rings, including one or more EMAT sensors in a circular distribution which can be used in propagation or pulse-echo modes. In a segregated flow regime, a single EMAT sensor in pulse-echo mode is used to measure holdups of fluid components.

9 Claims, 11 Drawing Sheets

(56) References Cited

U.S. PATENT DOCUMENTS

2015/0285058 A1* 10/2015 Gao .................... G01N 29/045
367/86
2021/0164341 A1 6/2021 Pfutzner

FOREIGN PATENT DOCUMENTS

| EP | 0922835 A2 * | 6/1999 | ............ E21B 43/14 |
|---|---|---|---|
| EP | 0922835 B1 | 5/2004 | |
| EP | 2317073 B1 | 1/2014 | |
| WO | 2017161126 A1 | 9/2017 | |
| WO | 2018201023 A1 | 11/2018 | |
| WO | 2019180168 A1 | 9/2019 | |

OTHER PUBLICATIONS

"Insonify Your Flow, Rosen EMAT Flowmeter", brochure by Rosen Group, Switzerland, 2015, 10 pages.

Masahiko Hirao and Hirotsugu Ogi, "EMATs for Science and Industry, Noncontacting Ultrasonic Measurements", Kluwer Academic Publishers, 2003, pp. 1-38.

R. N. Thurston and Allan D. Pierce editors, "Physical Principles of Measurements with EMAT Transducers", In: Ultrasonic Measurement Methods, Physical Acoustics, vol. XIX, Academic Press, Inc., 1990, pp. 157-200.

International Search Report and Written Opinion of Interntional Patent Application No. PCT/US2019/034345 dated Sep. 20, 2019, 11 pages.

International Preliminary Report on Patentability of International Patent Application No. PCT/US2019/034345 dated Dec. 10, 2020, 8 pages.

* cited by examiner

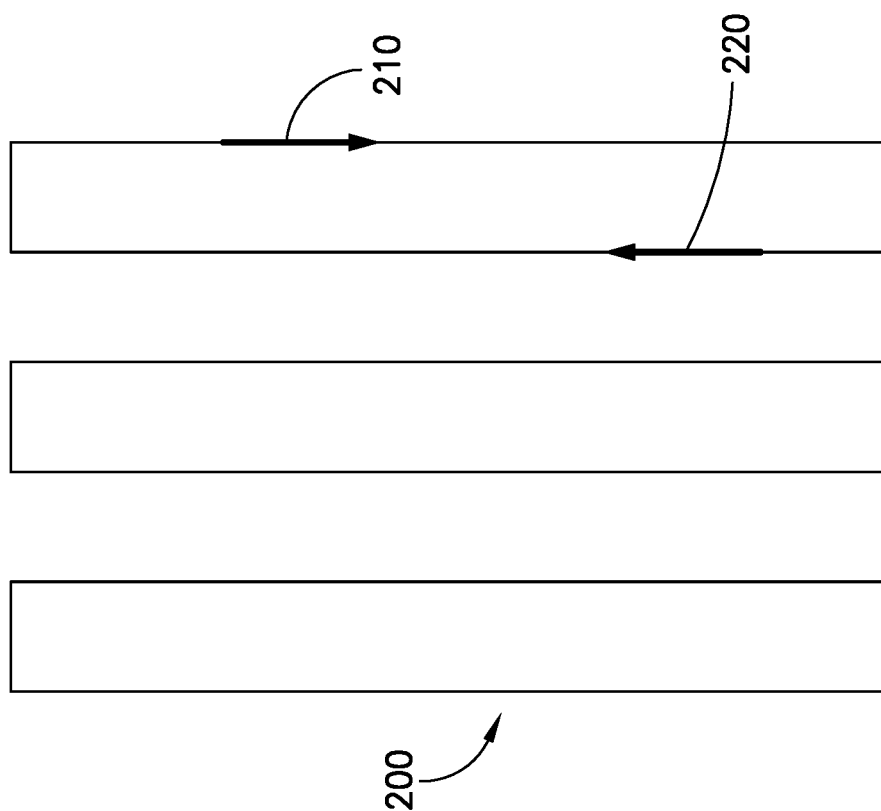

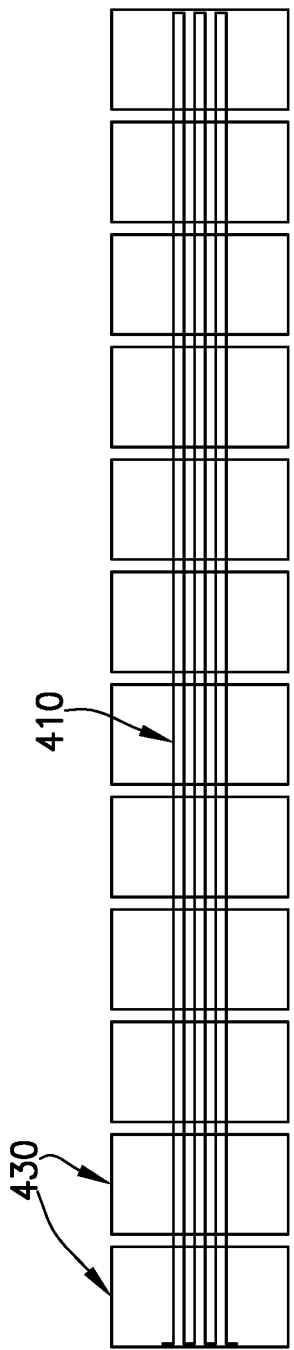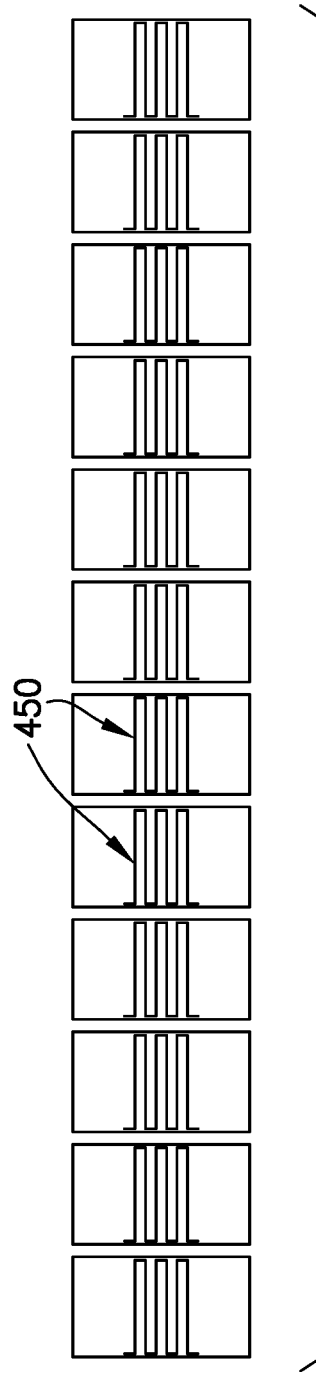

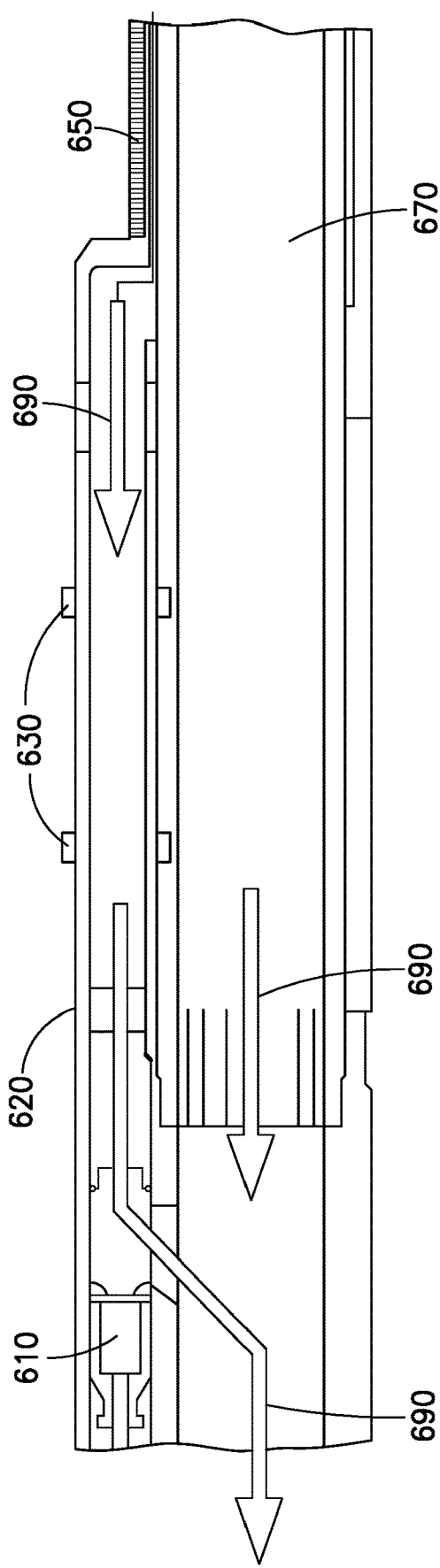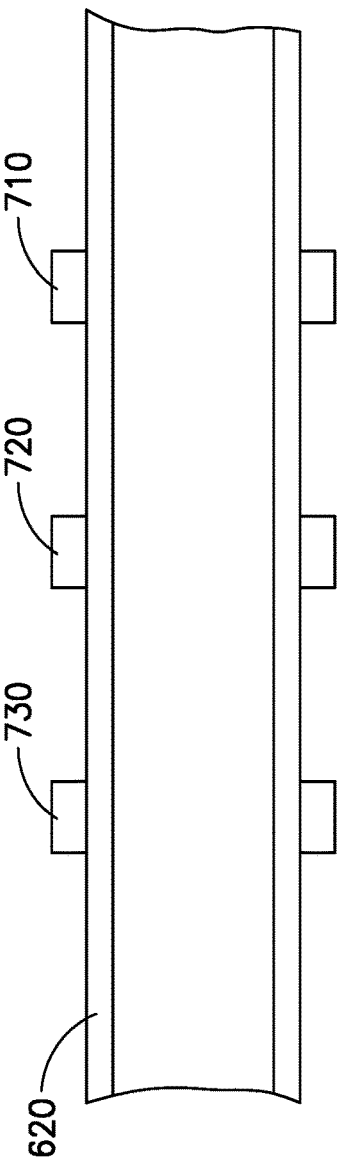
FIG.6
FIG.7

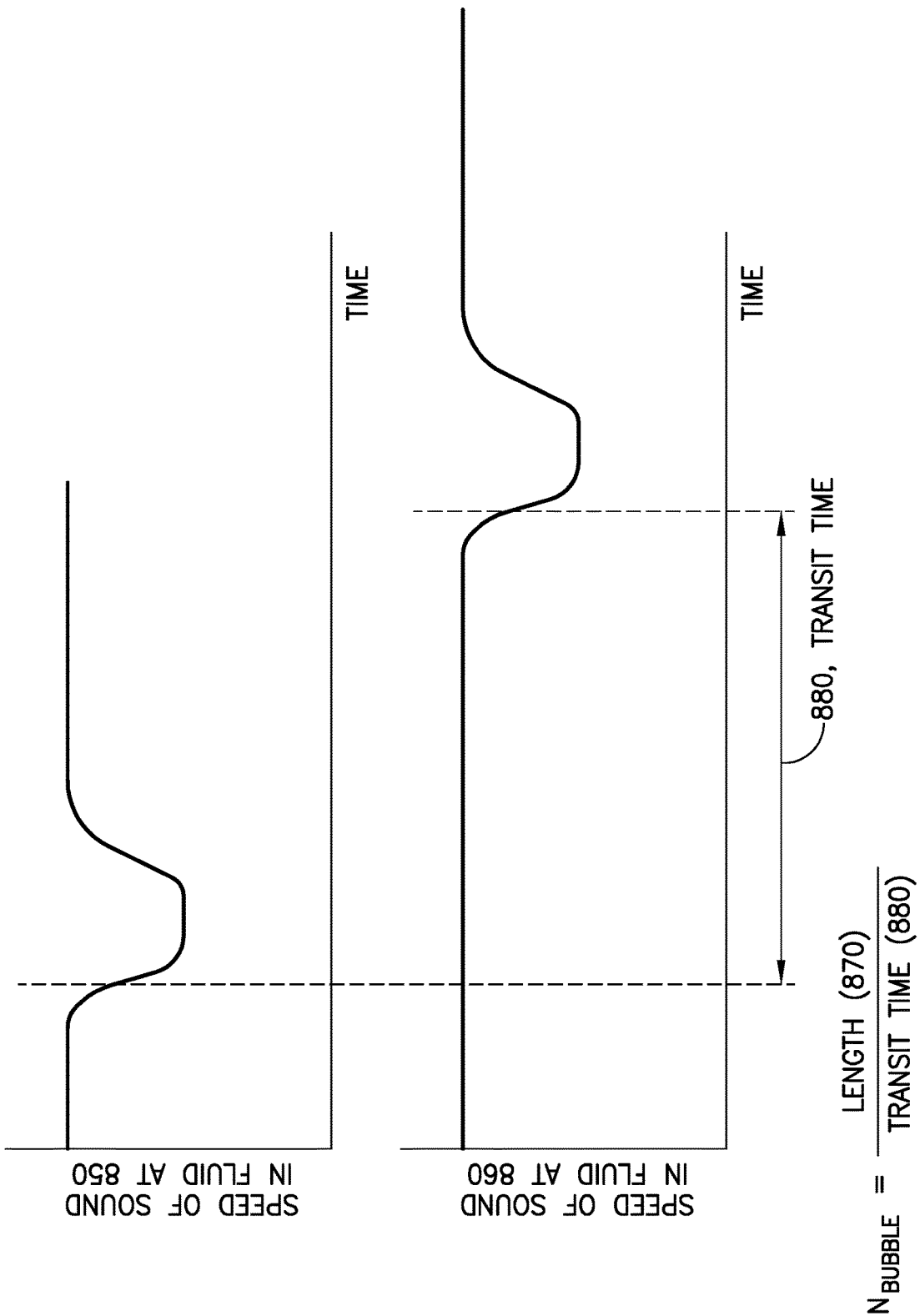

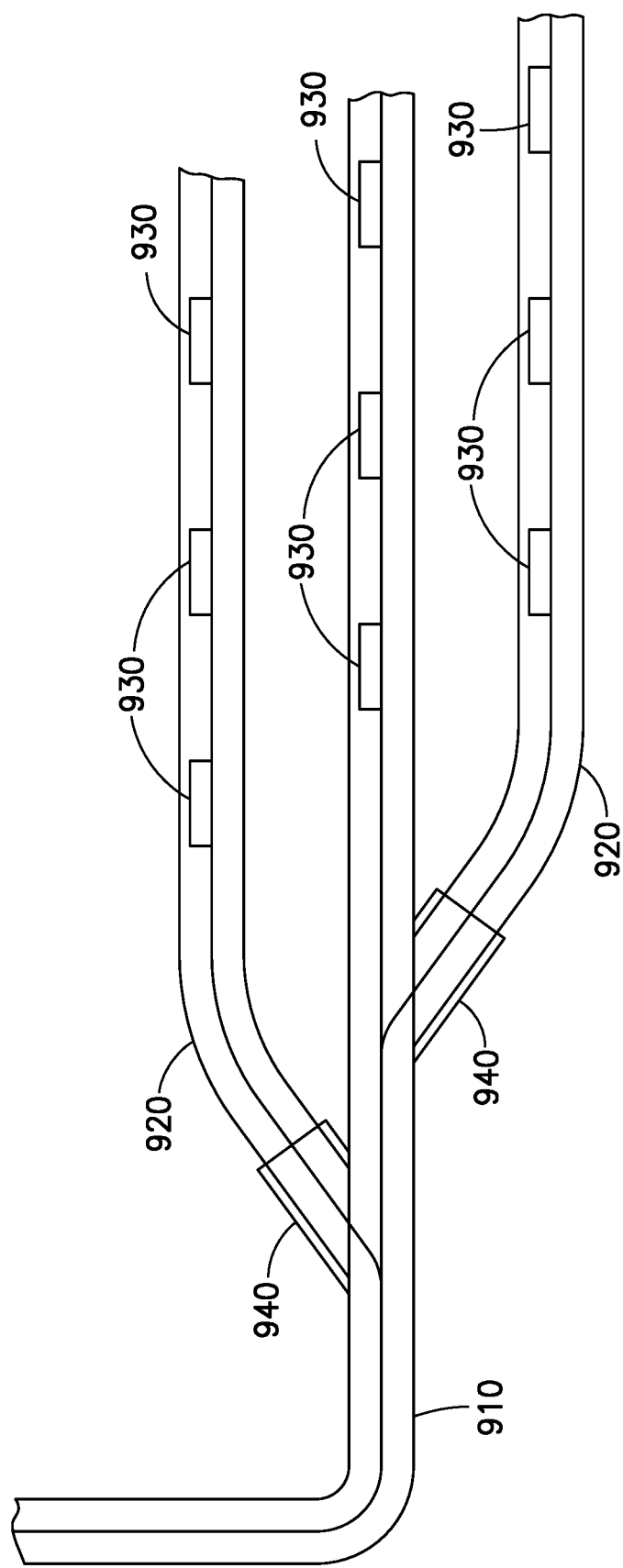

DOWNHOLE FLOWMETER

CROSS-REFERENCE TO RELATED APPLICATION

This application is a divisional of U.S. patent application Ser. No. 17/059,616, filed on Nov. 30, 2020, which was the National Stage of International Application No. PCT/US2019/034345, filed on May 29, 2019, which claims the benefit of U.S. Provisional Application No. 62/678,474, filed on May 31, 2018. Each of the above applications is hereby incorporated by reference in its entirety.

FIELD

The subject disclosure relates to measuring a volumetric flow rate and speed of an ultrasound wave through a fluid that is flowing in an electrically conducting tube. Moreover, the subject disclosure uses an electromagnetic acoustic flowmeter to carry out such measurements.

BACKGROUND

The production phase of an oil and gas bearing earth formation includes lengthy periods of time during which fluids from the reservoir are extracted. The fluids are typically water, oil and gas phases with volume ratios that change with time. The fluid volume ratios in the formation and in a production line are usually not the same, as each fluid has its own relative permeability. Different techniques are used to stimulate the formation fluid to flow into the production line and it is important to monitor the efficiency of these techniques by measuring the volumetric flow rate of production fluid components as a function of time. For example, water flooding may be used to push the oil, gas, and water towards the production well. During water flooding, the oil and gas volume ratios in the reservoir decrease with time, which necessitates monitoring the production rate of oil and gas as a function of time. An accurate measurement of each of the components is important to any oil exploration and production company as it helps with managing the reservoir, determining how the recovery of such oil and gas is proceeding and how it can be increased.

In a well producing from a single reservoir and at a single fluid entry point, measuring the flow rates of oil can be done at a surface location. In some embodiments, measurements are made at a downhole location since flow composition changes with pressure and temperature which invariably change as the fluid moves towards and reaches a well head. However, when there are multiple producing zones within a single well, the flow measurement at the surface can be ambiguous as it will not provide detailed flow information from individual producing zones. In particular, when producing zones are separated by flow control valves or there are multilaterals with individual flow control valves or a combination of both, then it may be necessary to monitor the flow rate from the different producing sections and multilaterals with flowmeters placed downhole and close to the entry point of flow to the production tube.

Downhole flow rates can be measured with wireline equipment or continuously with installed downhole flowmeters.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, an apparatus includes a first tube through which a fluid is produced; a flowmeter including one or more electromagnetic acoustic transducer (EMAT) elements; a flow control valve in fluid contact with the first tube; a second tube in fluid contact with the flow control valve; and wherein the first tube, the flowmeter, and the flow control valve are located external to the second tube.

In an embodiment, a method includes: providing a first tube that conducts a fluid from a zone, a flow control valve and a flowmeter comprising one or more electromagnetic acoustic transducer (EMAT) ring pairs wherein each electromagnetic acoustic transducer (EMAT) ring pair comprises an electromagnetic acoustic transducer (EMAT) sensor placed circularly around the first tube; measuring a first travel time of an acoustic wave generated by a first electromagnetic acoustic transducer (EMAT) ring and received by a second electromagnetic acoustic transducer (EMAT) ring of a first electromagnetic acoustic transducer (EMAT) ring pair; measuring a second travel time of an acoustic wave generated by the second electromagnetic acoustic transducer (EMAT) ring and received by the first electromagnetic acoustic transducer (EMAT) ring of the first electromagnetic acoustic transducer (EMAT) ring pair; obtaining a derived flow property wherein the derived flow property is used to make a reservoir management decision.

In an embodiment a method includes: providing an electric submersible pump and an electromagnetic acoustic transducer flowmeter in a producing well; pumping a fluid from the producing well using the electric submersible pump; using the electromagnetic acoustic transducer flowmeter to generate a measured flow property of the fluid; and inferring an operational parameter of the electric submersible pump using the measured flow property.

Other aspects and advantages of the claimed subject matter will be apparent from the following description and the appended claims.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 2 is a schematic drawing of a coil design;

FIG. 4A depicts a single element coil designed to wrap around the outside of a flow tube and provide eddy currents from a single EMAT element in a ring configuration;

FIG. 4B depicts a multi-element coil designed to wrap around the outside of a flow tube and provide eddy currents for individual EMAT elements in the EMAT ring;

FIG. 6 is a schematic drawing of an intelligent completion module having an EMAT flowmeter and a flow control valve;

FIG. 7 is a schematic drawing of an EMAT flowmeter equipped with three EMAT rings enabling flow measurements along different parts of the zonal flow tube;

FIG. 8B is a graphical representation of a response of two EMAT flowmeters to the passage of gas bubbles in a production tube;

FIG. 9 depicts a multilateral well comprising a horizontal well and a plurality of lateral wells equipped with intelligent completion modules;

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Embodiments are disclosed which measure a flow rate of a mixed multiphase fluid and a volume ratio of individual fluid phases in a flow from a production zone in a well. The fluid from a zone passes through a zonal flow tube that delivers the fluid to the main production tube which is carrying the fluid from other upstream zones and eventually delivers the production from all zones to the well head. In an intelligent completion, the flow rate of a mixed multiphase fluid and the relative volume of individual phases from a production zone are monitored and the data is used to control the flow to ensure the production rate is optimum in the early phase of production. The flow composition is also used to assess the economic value of the producing zone during a later phase of production when the oil content tends to go down. An electromagnetic acoustic transducer, EMAT, is used to generate and measure an acoustic signal which travels through the fluid carrying tube in both upstream and downstream directions. This acoustic signal is used along with a doppler effect to determine a flow rate and a speed of sound in the fluid.

Figure 1:
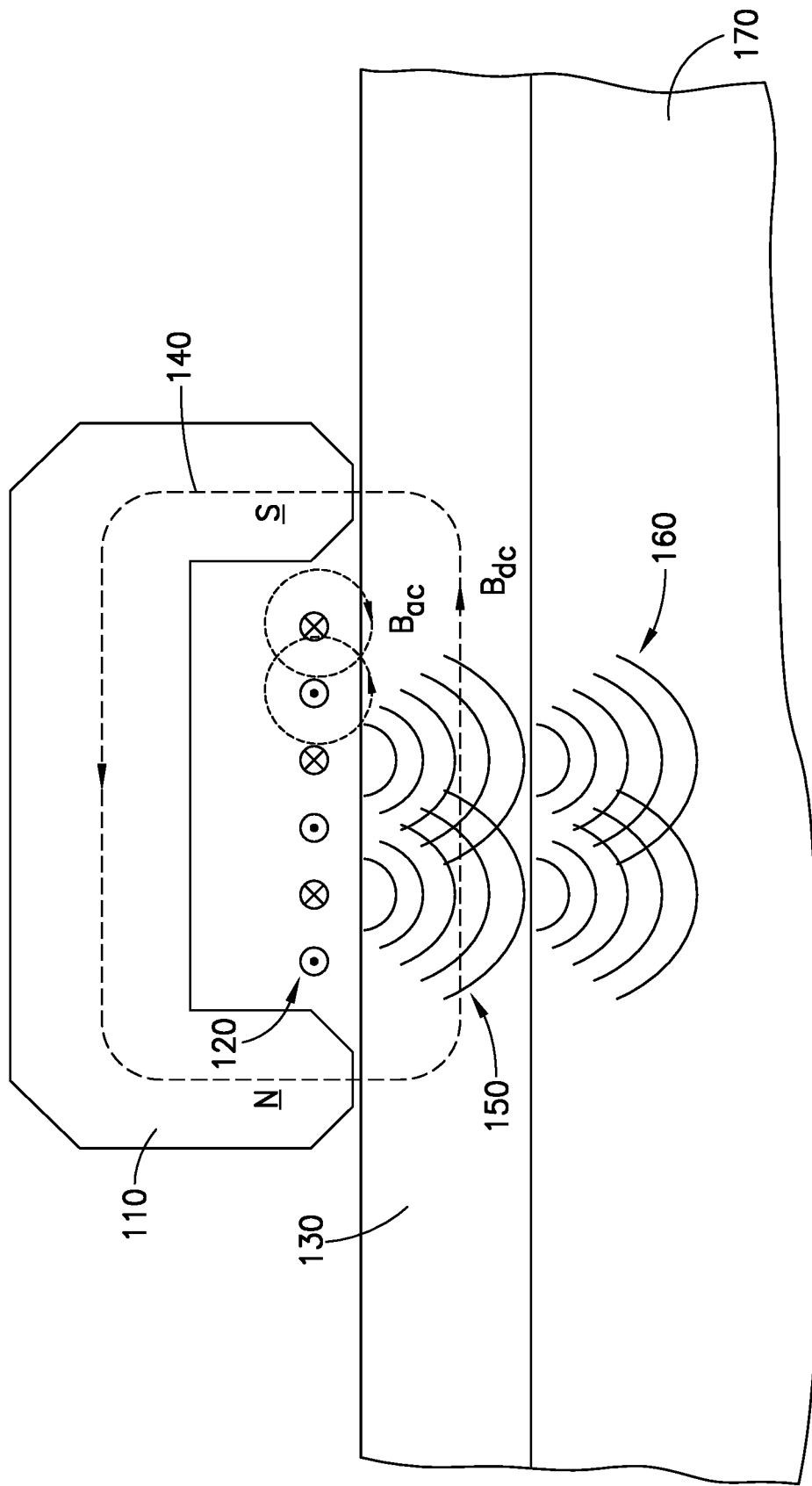
FIG. 1 is a schematic drawing of an embodiment of the subject disclosure.

FIG. 1 depicts an embodiment of the subject disclosure. The EMAT device includes a permanent magnet 110, a coil 120, and a metal substrate 130. The permanent magnet 110 produces a continuous magnetic field 140 within the metal substrate 130. The coil 120 is arranged to generate current lines perpendicular to the continuous magnetic field 140 to maximize the Lorentz force and the resulting displacement. In an embodiment, the coil 120 is configured as a meander coil 200, shown in FIG. 2, such that neighbouring windings 210 and 220, for example, have opposite current directions. The opposite current directions are shown as dots and crosses in the cross-sectional view of the coil 120 in FIG. 1. The exciting AC current flowing in each winding of the coil 140 generates a corresponding eddy current in the conductive substrate 130. The eddy current and the exciting current have opposing directions. In a conductive material such as a metal substrate, the eddy current is confined to a very thin surface layer of the material, referred to as the skin depth. The skin depth is inversely related to the square root of the AC current frequency, the conductivity and the magnetic permeability of the substrate 130. Typically, for common metal substrates and a 1 MHz exciting AC current, the skin depth is less than a millimetre. The thin skin depth concentrates the eddy currents near the magnet which enhances the Lorentz force. The combination of eddy current and the DC magnetic field 140 leads to a Lorentz force perpendicular to the direction of both the DC magnetic field 140 and the eddy current. For the geometry of FIG. 1 where the DC magnetic field is horizontal in the plane of the figure and the eddy currents are perpendicular to the plane of the figure, the Lorentz force and the displacement are up or down depending on the eddy current direction from each winding, which changes with time at the frequency of exciting AC current. Since the eddy current direction in adjacent windings are opposed to each other, the Lorentz force is also alternating between adjacent windings.

The time varying Lorentz force induces time dependent displacements in the body of substrate 130 which vibrates the metal substrate causing sound waves 150 to be generated which propagate in the wall thickness of substrate 130. The choice of magnetic field and current directions in FIG. 1, causes the displacement to alternate between tensile and compressional waves. The sound wave 150 has the same frequency as the exciting AC current which is typically in the MHz range. In situations where the substrate 130 is a metal tube, the wave 150 propagates to the tube inner wall, emanates, and couples to the fluid 170 contained in the tube as a hemispherical wave 160 having radial and longitudinal components.

As with most acoustic transducers, the process can also work in reverse so that the EMAT device of FIG. 1 can also be used as a receiver to detect an acoustic wave. In the acoustic detection mode, an acoustic wave travels through the metal substrate so that tensile and compressional forces exist within the metal 130. These forces, in the presence of a DC magnetic field, in turn induce an alternating current within the meander coil that can be detected by acquisition electronics.

The EMAT device depicted in FIG. 1 is referred to as an element. A plurality of elements can be used to design non-invasive flowmeters which are used to measure the fluid properties such as flow rate and the speed of sound. Typically, a single element or a plurality of elements are arranged circumferentially and laterally to achieve different flow metering goals.

Figure 3A:
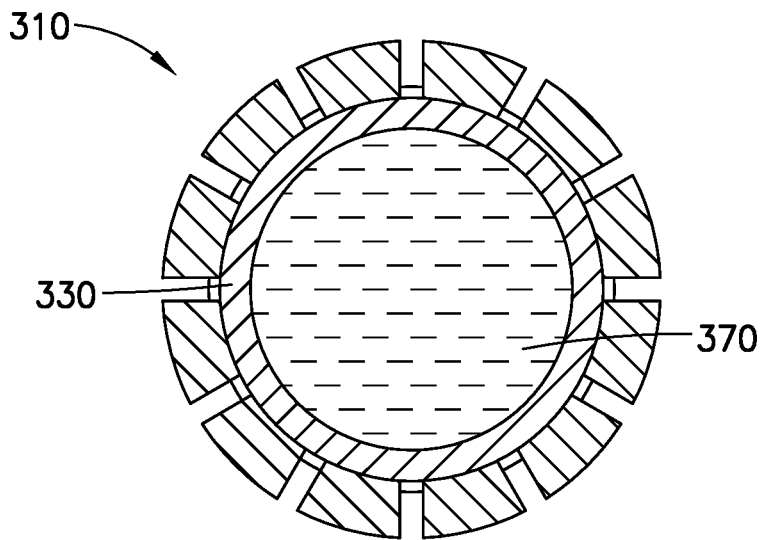
FIG. 3A is a cross-sectional view of an EMAT ring in which a plurality of permanent magnet segments is distributed around a flow tube and a coil circles the flow tube.

In an embodiment, depicted in FIG. 3A, an elongated single EMAT element 310 is applied around the circumference of the tube 330 which is filled with fluid 370. In this design, an elongated meander coil constructed from solid wire or built on a flex circuit material can be wrapped around the tube and excited to provide eddy currents. In an embodiment, the DC magnetic field 140 is supplied by multiple permanent magnet segments. FIG. 4A shows a single elongated meander coil 410 with multiple permanent magnet segments 430 laid out flat, prior to wrapping around a tube. The number (12 in the example of FIG. 4A) and dimensions of segments 430 are adjusted to match the number and dimension of the magnets which are determined by the outside circumference of the tube 330. The array of permanent magnets covers the circumference of the tube. This is an arrangement of a single EMAT element in a ring shape which we refer to as an EMAT ring. In an embodiment, each EMAT ring covers the circumference of the flow tube 330.

In a further embodiment, FIG. 4B shows multiple EMAT transducers comprising multiple meander coils 450 arranged side by side. This configuration can also be implemented as a ring that covers the circumference of the flow tube 330. This configuration has the added benefit of exciting and detecting independently with each element in the ring.

Figure 3B:
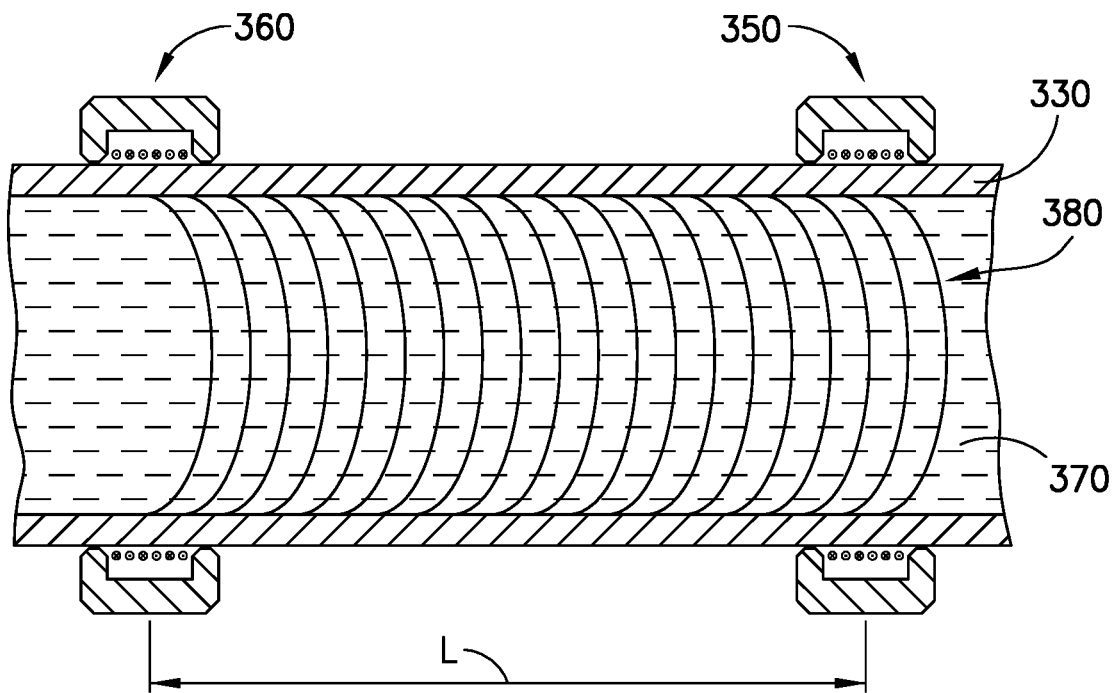
FIG. 3B is a section of flow tube with two EMAT rings spaced along an axial direction of the flow tube.

FIG. 3B shows two EMAT rings 350 and 360 spaced laterally along the length of tube 330 by a distance L which depends on the inner diameter of the tube and the speed of sound in the fluid, which is typically about 6 to 12 inches, but it can be longer or shorter if desired. The two EMAT rings serve to characterize the flow rate of the fluid 370 and the speed of sound through the fluid 370. In an embodiment, one of the EMAT rings acts as a transmitter while the other ring acts as a receiver of acoustic energy. When used to transmit acoustic energy, at each point on the circumference of the tube that is coupled to the EMAT ring 350, a hemispherical acoustic wave emanates from the interior wall of the tube and transmits into the fluid 370 within the tube. Radial components of the hemispherical wave are cancelled by the corresponding wave from the opposite side of the tube wall since the direct magnetic field and the eddy currents are symmetrically distributed around the tube. As a result, only the longitudinal component of the wave remains. The longitudinal wave is shown in FIG. 3B by wave crests 380. The bulk wave, which is the superposition of the longitudinal components from all emanating points about the inner circumference of the tube, travels longitudinally through the fluid in both downstream and upstream directions away from the generating EMAT device 350. The second EMAT ring 360 is placed some distance upstream or downstream from the first ring and measures the sound wave. The two EMAT rings 350 and 360 alternate as a generator and detector of the acoustic wave. The bulk wave traveling toward the second EMAT ring is detected and the transit time from generating ring to detecting ring is measured. A second transit time is measured when the roles of generating device and detecting device have been switched.

The flow properties defined here as the fluid flow rate and the velocity of sound in the fluid are determined from the two measured transit times as per the equations for the Doppler Effect:

$$V_{flow} = \frac{L}{2} \frac{(t_{RU} - t_{RD})}{t_{RU} * t_{RD}}$$

$$V_{sound} = \frac{L}{2} \frac{(t_{RU} + t_{RD})}{t_{RU} * t_{RD}}$$

where $t_{RU}$=transit time with receiver upstream; $t_{RD}$=transit time with receiver downstream and L=lateral distance between the two EMAT rings.

Figure 5:
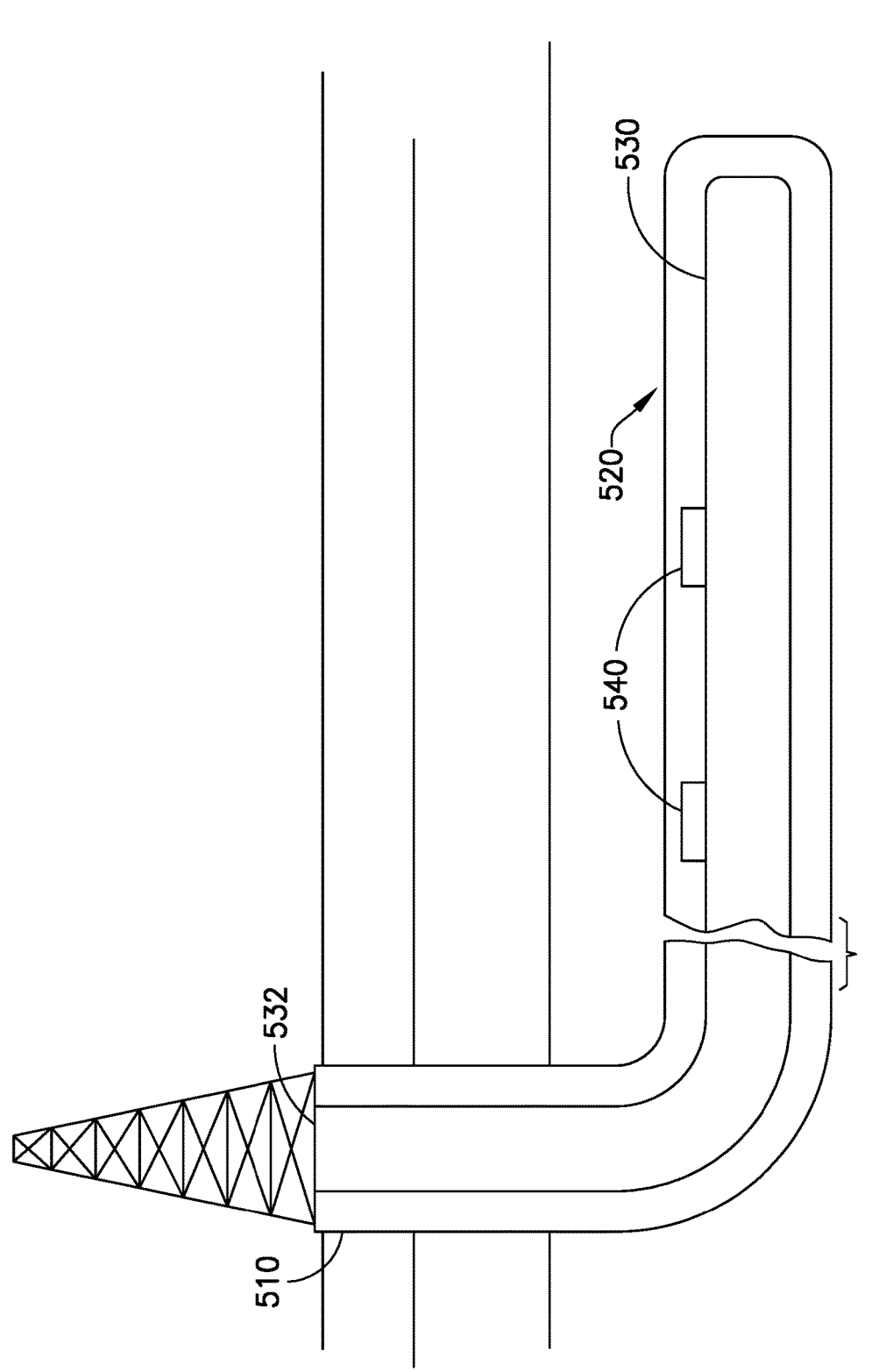
FIG. 5 depicts a horizontal well with multiple fluid entry points and intelligent completion modules provided at each fluid entry point.

Oil wells are drilled to intersect with a hydrocarbon bearing reservoir formation enabling the hydrocarbons to be extracted. In some cases, the well passes through multiple hydrocarbon bearing zones which may be produced concurrently. This makes multi-zonal production common in the oil industry especially from wells requiring high capital investment such as horizontal wells. FIG. 5 is an example of a horizontal well 510 intersecting a reservoir 520 where multiple entry points are chosen to produce hydrocarbon from the reservoir 520. Multiple entry points are chosen to produce the reservoir at a faster rate and to have flexibility in controlling flow from different zones. The reservoir may be segmented due to geological activities or it may be geologically sectioned due to thin impermeable or low permeability streaks within the reservoir. In addition, the existing heterogeneity in the reservoir may justify multiple entry points. The production tube 530 comprises a plurality of production tubing sections and provides fluid communication between the multiple entry points and a well head 532. The produced fluid from different flow entry points enters the production tube 530 and is mixed with produced fluid from other entry points before reaching the well head 532.

During a production phase it is desirable to monitor flow rate and flow composition from individual entry points. This is especially true at a later production phase when some of the entry points may not produce high enough oil content to make production from these entry points economically viable. To monitor a flow from these wells the flowmeters at the surface will not suffice because flow from all producing zones typically arrives at the surface in a single production tube and it is no longer possible to determine the relative oil, water, and gas flow rates from each producing section independently. In some situations, flow monitoring can be achieved using logging tools delivered to the vicinity of the entry points from the well head. These logging tools are then used to measure flow properties. This is an expensive operation as it may require production from the upstream entry points to be halted temporarily. In the oil industry, flow monitoring is planned by integrating intelligent completion modules with the production pipe. The completion modules are placed at the entry points and can monitor the fluid continuously. In some situations, the intelligent completion may also provide flow control valves on the spot that can be used to control or to completely close the flow from an entry point. In an embodiment, an intelligent completion module 540 is shown in FIG. 5 and is shown in more detail in FIG. 6.

In FIG. 6, an intelligent completion module is provided to monitor and control the flow at an entry point. The completion module forms a section of a production tube and is designed to be installed within the production tube run. The completion module is considered a non-intrusive completion module as it has a similar tube inner diameter so as not to interfere with normal flow in the production tube. The module takes advantage of the annular gap between the production tube and the larger diameter well borehole to place components needed to make necessary measurements and to execute flow control decisions. In FIG. 6, a screen 650, a zonal production tube 620 and a flow control valve 610 are provided in the available space between the outside wall of the production tube and the borehole wall. The flow location and direction are indicated by the arrows 690. In addition, a non-invasive flowmeter 630 is provided between the screen 650 and the flow control valve 610. In an embodiment, the flowmeter may be clamped on. In a further embodiment, the flowmeter may be an integral part of a zonal production tube.

In an embodiment, the flowmeter 630 uses EMAT sensors to provide flow information. In use, the fluid from the formation enters through the screen 650 to the zonal production tube 620 and is guided past the flowmeter and flow control valve to the main production tube. The flowmeter 630 is equipped with EMAT sensors and measures the flow rate and speed of sound in the flowing fluid and the data is used by a processor or an operator to determine flow from a particular zone. In an embodiment, an example decision may be comparing a percentage of water in the fluid with a preset maximum limit and when the water content in the flow exceeds this limit activating the flow control valve to stop any production from this zone. In an embodiment, decisions may range from using a flow control valve to increase flow, restrict and limit flow from a particular zone or completely block flow from this particular zone.

In an embodiment, the EMAT flowmeter comprises two EMAT rings spaced apart axially on the zonal production tube 620. FIG. 3 above depicts this design. In a further embodiment, shown in FIG. 7, three EMAT rings are provided. The three EMAT rings 710, 720, and 730 are distributed symmetrically such that the distance between the EMAT rings 710 and 720 is the same as the distance between the rings 720 and 730. Each of the three EMAT rings in FIG. 7 operate as transmitter and receiver sequentially which provides enough data to calculate flow properties from three flowmeters. By symmetry, the combination pair of 710 with 720 is expected to provide the same information as the pair formed by combining 720 with 730. Any significant difference is an indication of variation in the fluid composition as it travels from one flowmeter to the next. The 710 with 730 pair provides flow data over a longer range of fluid compared with the other two pairs and can provide an extra check indicating whether the fluid regime is still developing, or it has already settled in a single flow regime. In an embodiment, a length of a zonal production tube is chosen to help the flow to settle in a single flow regime. A single flow regime helps with interpretation of the data from any flowmeter. In an embodiment, a length of a zonal production tube is five to ten times the inner diameter of the tube and in other embodiments twenty or more times the diameter of the zonal production tube. In a further embodiment EMAT rings 710, 720, and 730 are not distributed symmetrically, leading to flow being measured at three different fluid lengths.

Figure 8A:
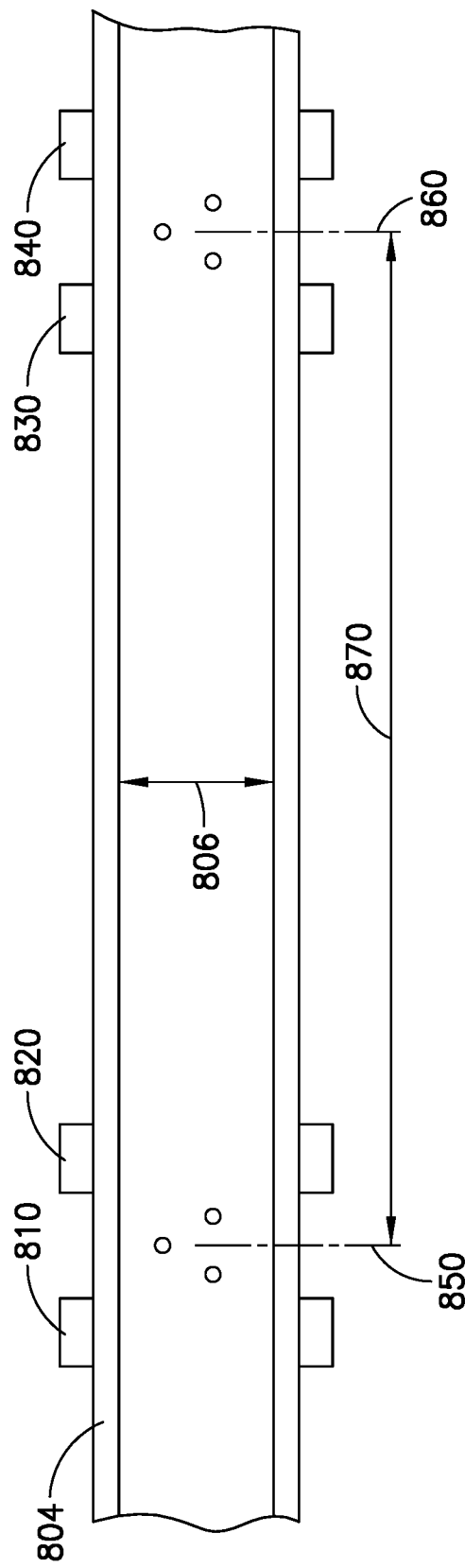
FIG. 8A depicts two EMAT flowmeters spaced apart enabling independent measurements which can be cross-correlated to determine a flow property.

In FIG. 8A, at least two flow metering EMAT ring sets, such as the combinations in FIG. 3 or 7, are placed axially apart on a zonal production tube. In FIG. 8A, a zonal production tube 804 having a diameter 806 is equipped with the EMAT ring pair 810 and 820 which measure flow properties centered at 850. In addition, the EMAT rings 830 and 840 measure the flow properties centered at 860. The measurement centers 850 and 860 are far enough apart so that any flow regime change will be noticeable between the two measurement centers. The distance 870 between measurement centers 850 and 860 is at least five times larger than the diameter 806 of the zonal production tube 804. Each set provides its own flow rates and the measurements from these two flowmeters are correlated to provide additional information on the flow. The upstream EMAT flowmeter measures a response due to a disturbance such as a gas bubble. The downstream EMAT flowmeter records the same disturbance when the disturbance reaches the second sensor set separated by a fixed distance from the first. In practice, there will be many bubbles of gas, so both sensor signals are recovered over a time window and compared or mathematically correlated. The two signals will successfully correlate after shifting one of them by a time corresponding to the average transit time of the bubbles between the two EMAT flowmeters; a parameter that will be extracted from the data by the cross-correlation routine. The cross-correlation flowmeter gives the velocity of the disturbance. FIG. 8B shows the measurements of the speed of sound in the fluid as a function of time. These measurements have been performed at positions 850 and 860, both as a function of time. As a gas bubble in the production tube passes through measurement position 850, a transient dip occurs in the measured velocity of sound in the fluid. A short time later, indicated in FIG. 8B as the transit time 880, a similar transient dip in the measured velocity of sound in the fluid occurs at the measurement position 860. The responses of the two sensors to the gas bubble will correlate when a time delay equal to the transit time 880 is introduced into the response from the sensor at measurement position 850. Similar measurements are produced when a slug of water or oil is passing through the flowing fluid; the polarity of the transient may be positive or negative depending on the speed of sound in the perturbing phase compared to the background. In addition, comparing the results from the two sets, provides information on how the flow is developing as it travels through the zonal production tube.

During early production, the flow may include a plurality of phases which include oil, gas and water at relatively high pressures. With time, as more and more reservoir fluids are produced, the pressure decreases, and the gas content may reduce. Later in the production phase, the fluids tend to be mainly two phases: oil and water. Flow decisions are usually made initially when the well is placed in production and later during production when some of the zones produce too much water. The measurements initially are dominated by the gas phase, unless the pressure is above the bubble point, while the later measurements are dominated by the water phase so that the role of the flowmeter changes with time. The flowmeter can operate during the entire production cycle.

The scenario of FIG. 5 is for a single horizontal well. Another application of the flowmeters is for multilateral horizontal wells shown in FIG. 9. The multilateral horizontal well of FIG. 9 is a combination of the first drilled horizontal or mother well 910 from which one or more side track wells are drilled to enhance the rate of production from the reservoir. The side track wells 920 are designed to be substantially parallel to the mother well. In addition to the use of intelligent completions 930 in the mother well 910, if the flow from individual producing sections is to be monitored and controlled each zone within the side track wells has intelligent completion modules 930 comprising downhole flowmeters and downhole flow control valves. As with the mother well 910, flowmeters at the surface will not provide detailed information because fluids from all producing zones arrive at the surface in a single production tube and the information about the relative oil, water, and gas flow rates and holdup from each producing section is already lost. When controlling flow in a multilateral well at the surface it is normal practice to alter flow from producing sections with a single valve which will not account for the different performances of each producing section, thus optimal flow from each section may not be achieved.

In an embodiment, an intelligent completion module with a downhole flowmeter and a flow isolation valve assembly of FIG. 6 is installed in each flow entry point of a multilateral well. The choice of EMAT flowmeters may be similar to the flowmeters discussed above in FIGS. 3, 6, and 7 for horizontal wells. In an embodiment, an intelligent completion module 940 may be installed at the interface between a mother-well and a side track. This is a specially designed module having an inner diameter which matches that of the production tube and includes only a flow control valve and a larger diameter EMAT flowmeter. Such a module provides the operator with the ability to control the entire side track.

Figure 10A:
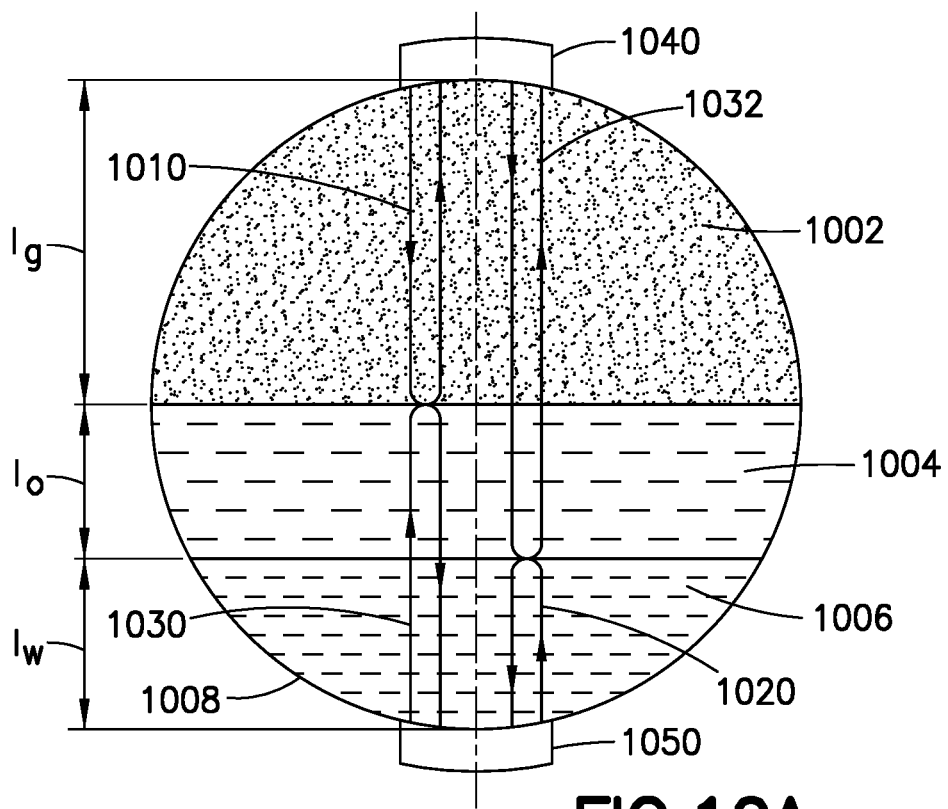
FIG. 10A depicts two EMAT elements located above and below a horizontal tube which can be used in pulse-echo mode to determine the arrival time of echoes from fluid interfaces which can be used to calculate the holdups of flow components.
Figure 10B:
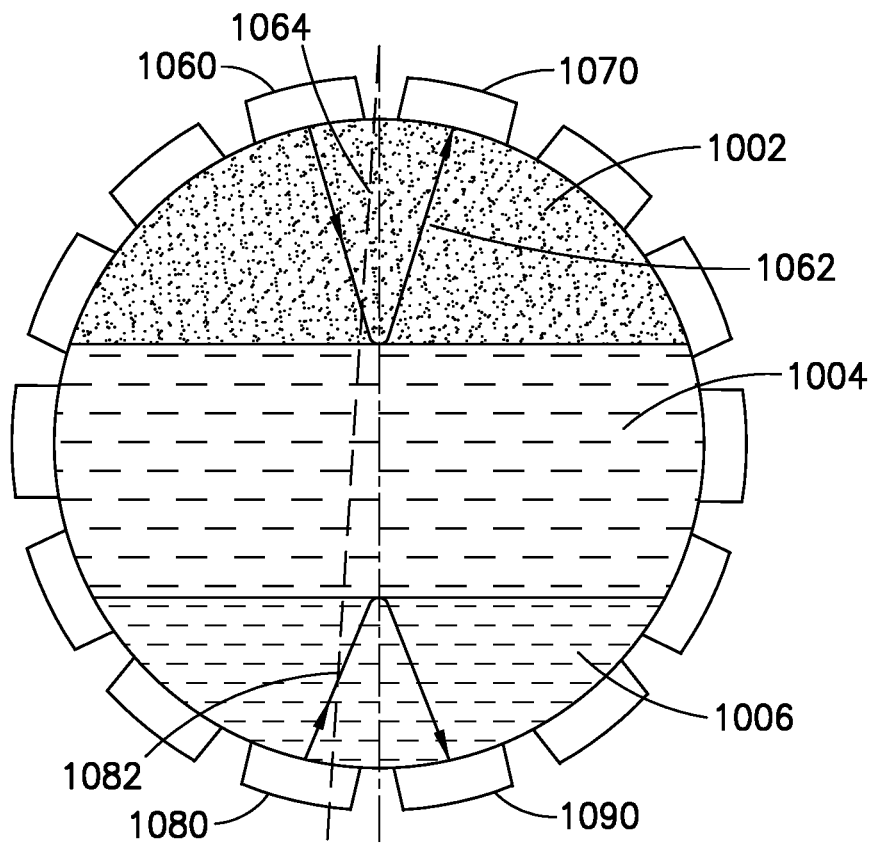
FIG. 10B depicts an EMAT ring used in pulse-echo mode which can be used even though none of the EMAT elements are in line with a vertical axis to provide holdup measurements.

In an embodiment, a segmented EMAT for holdup measurements is disclosed. The EMAT flowmeters described above measure a bulk fluid velocity of an assumed homogeneous fluid. In the case of multiphase flow in a horizontal tube comprising different regimes or strata of flow for water, oil, and gas, a variation of the EMAT flowmeter is required to obtain water, oil and gas holdups. A scheme for measuring holdups in segregated flows within a horizontal well is shown in FIGS. 10A and 10B in which the EMAT device operates in a pulse-echo mode. In an embodiment, the device of FIGS. 10A and 10B are based on an individual EMAT element which covers a small arc of the tube circumference and operates in pulse-echo mode. Because the EMAT element only covers a portion of the circumference and because multiple small arc EMAT elements may be used in an array, this will be called a segmented EMAT device. This is in contrast with the full circumference EMAT ring described above. In a segmented EMAT device with full coverage around the pipe, the meander coil of FIG. 4B is used with corresponding direct magnetic fields. This arrangement is equivalent to a plurality of small EMAT devices, each covering a small arc of the pipe circle with the extent of the arc defined by the number of individual meander coils 450. This segmented EMAT device is excited by a plurality of AC currents and in detection provide a plurality of measured signals; the number being equal to the number of independent meander coils 450. This is in contrast with the EMAT rings which use the meander coil 410 which covers the entire arc or perimeter of the pipe and is excited or detected as a single signal.

In an embodiment, shown in FIG. 10A, a horizontal flow tube 1008 is provided with a first EMAT element 1040 mounted on the top and a second EMAT element 1050 mounted diametrically on the bottom of the tube. The tube 1008 is filled with a segregated three-phase fluid: a gas layer 1002, an oil layer 1004 and a water layer 1006. The acoustic emission from the element 1040 travels to the gas/oil interface and is partially reflected following a path 1010 that extends from the element 1040 to the interface and back to the element 1040 forming a first echo. The part of the acoustic wave that has not been reflected continues to propagate through the oil layer 1004 and is partially reflected as it reaches the oil/water interface. The newly reflected wave propagates back to the element 1040 and forms a second echo that has reached the element 1040. The path 1032 for the second echo extends from the EMAT element 1040 to the oil/water interface and back to element 1040. The paths 1010 and 1032 are drawn as two separate paths in FIG. 10A for clarity, but they are superposed paths.

Similarly, the acoustic emission from element 1050 travels in the water layer 1006 to the water/oil interface and is partly reflected following a path 1020 forming a first echo in EMAT element 1050. A portion of the acoustic wave continues to propagate through oil layer 1004 and is partly reflected as it reaches the oil/gas interface. The newly reflected wave propagates back to the element 1050 and forms a second echo detected by the element 1050. The path 1030 of the second echo extends from the EMAT element 1050 to the oil/gas interface and back to element 1050. Thus, each interface is sampled twice, once from each EMAT element. There is also an additional reflection from the tube wall which is not shown for clarity. In some cases, the fluid may be one or two-phase fluid. In these situations, the number of interfaces and therefore the number of echoes vary accordingly.

The vertical distance through each medium, shown in FIG. 10A, are labeled as $l_g$, $l_o$, and $l_w$. In the arrangement of FIG. 10A, the path 1010 travels the gas layer thickness twice, therefore path 1010 can be used to calculate $l_g$ as:

$$l_g = \frac{v_g t_g}{2}$$

where $v_g$ is the velocity of sound in the gas and $t_g$ is the round-trip transit time of the sound wave reflected from the gas to oil interface and is the arrival time of the first echo in EMAT 1040. Likewise, $$l_w = \frac{v_w t_w}{2}$$

where $v_w$ is the velocity of sound in the water and $t_w$ is the round-trip transit time of the sound wave reflected from the water to oil interface and is the first echo arrival time in EMAT element 1050.

Finally, although $l_o$ is not needed in the subsequent calculations it can be computed, knowing the inner diameter of the pipe (D), without the use of second echoes as:

$$l_o = D - l_g - l_w$$

One can compute the gas, oil and water holdups, $Y_g$, $Y_o$, and $Y_w$ from the lengths of the three phases: $l_g$, $l_o$, and $l_w$. The cross-sectional area (circular segment) occupied by the gas is defined by the area of the circle (arc) and the chord of the circle, where the chord is the gas to oil interface:

$$A_{chord\,gas} = \cos^{-1}\left(1 - \frac{2l_g}{D}\right)\left(\frac{1}{180}\right)\left(\frac{\pi D^2}{4}\right) + \left(l_g^2 - \frac{Dl_g}{2}\right)\sqrt{1 - \frac{D}{l_g}}$$

$$Y_g = \frac{A_{chord\,gas}}{\left(\frac{\pi D^2}{4}\right)}$$

Similarly, for the chord corresponding to the oil to water interface:

$$A_{cord\,water} = \cos^{-1}\left(1 - \frac{2l_w}{D}\right)\left(\frac{1}{180}\right)\left(\frac{\pi D^2}{4}\right) + \left(l_w^2 - \frac{Dl_w}{2}\right)\sqrt{1 - \frac{D}{l_w}}$$

$$Y_w = \frac{A_{chord\,water}}{\left(\frac{\pi D^2}{4}\right)}$$

Finally, the oil holdup, $Y_o$, is obtained from the other two holdups by simple subtraction.

$$Y_o = 1 - Y_g - Y_w$$

In an embodiment, the second echo detected by EMAT elements 1040 and 1050 (paths 1032 and 1030) can be used to provide a second set of independently measured phase length values ($l_g$, $l_o$, and $l_w$). These values can be compared with the results from previous calculations.

In an embodiment, only one EMAT element is used and is placed at the top or at the bottom of the pipe. Placing the EMAT element at the bottom ensures that the first and second echoes do not have to travel through the gas phase which is highly attenuative for sound waves. This embodiment is like FIG. 10A except the device 1040 is not used, causing the paths 1010 and 1032 to be absent. As before, a sonic wave generated by the EMAT element 1050 reflects from the water/oil interface and is measured as the first echo having travelled the path 1020. Part of the wave enters the oil layer 1004 and reflects from the oil to gas interface and is measured by the device 1050 as the second echo having travelled the path 1030. As described above the echo arrival times are $t_w$ and $t_o$. These echo times can be converted to the water and oil holdups from which the gas holdup is easily calculated. The configuration where the EMAT element is at the top suffers from extra attenuation of sound waves travelling through a highly attenuative gas medium. To offset this, the amplitude of the generated acoustic wave in this configuration may have to be much greater than where the source is at the bottom. Similarly, the gain on the preamp of the detection electronics may have to be much greater as a weaker signal needs to be detected.

The two EMAT source configuration of FIG. 10A work fine if the sources are substantially lined up with the vertical direction so that the incident sound wave is perpendicular to the fluid interfaces. Small deviations from vertical cause the echo intensity to suffer, as part of the echo signal is directed away from the sensitive detection window of the EMAT element. Larger deviations from vertical may cause the echo to completely miss the detection window leading to no signal. Although it is possible to install the two-source configuration of FIG. 10A correctly, it may add additional costs. To make the device more flexible, extra EMAT elements are added to enable echo detection even if the transmitting EMAT is not vertical. In particular, an EMAT ring can provide extra EMAT elements, thus making the measurement with more flexibility.

An accelerometer or other angular orientation sensing device may be mounted with the flowmeter as an aid in determining the orientation of the system and selection of the EMAT elements in the EMAT ring that are usable for the top and bottom devices. If none of the elements are lined up with the vertical axis, use is made of the two closest EMAT elements to the vertical axis at the bottom and two closest EMAT elements closest to the vertical at the top. In an embodiment, shown in FIG. 10B, an EMAT ring is used in pulse-echo mode offering a full circular array of segmented EMAT elements. A complete array of segmented EMAT elements allows for the selection of more than one device at the top and at the bottom of the tube, enabling holdup measurements regardless of the tube orientation. In the example of FIG. 10B, the EMAT element 1060 is closest but is not aligned with the vertical. As a result, the incident wave 1064 is not perpendicular to the gas/oil interface and the echo 1062 will not reach the EMAT element 1060 for detection. Instead the echo 1062 is detected by the EMAT element 1070. Similarly, the transmitter 1080 at the bottom is the closest but is not aligned with the vertical, so the echo 1082 reflects from the water to oil interface and is detected by the receiver 1090. Since the angle between the two EMAT elements is accurately known, trigonometry can be used to correct for the misalignment.

The quantity relating to fluid phase flows that is of particular interest to the operator of an oil well is the watercut because it relates directly to the economic productivity of an oil well. Watercut is defined as the volume fraction of water produced at the surface. It is computed as the product of the water flow rate as measured by the two ring EMAT flowmeter and the water holdup as measured by the segmented EMAT for holdup measurements:

$$\text{Watercut} = q_w = v_w * Y_w$$

Similar relationships apply to the gas and oil phases which can be used to calculate the gas and oil cuts.

Figure 11:
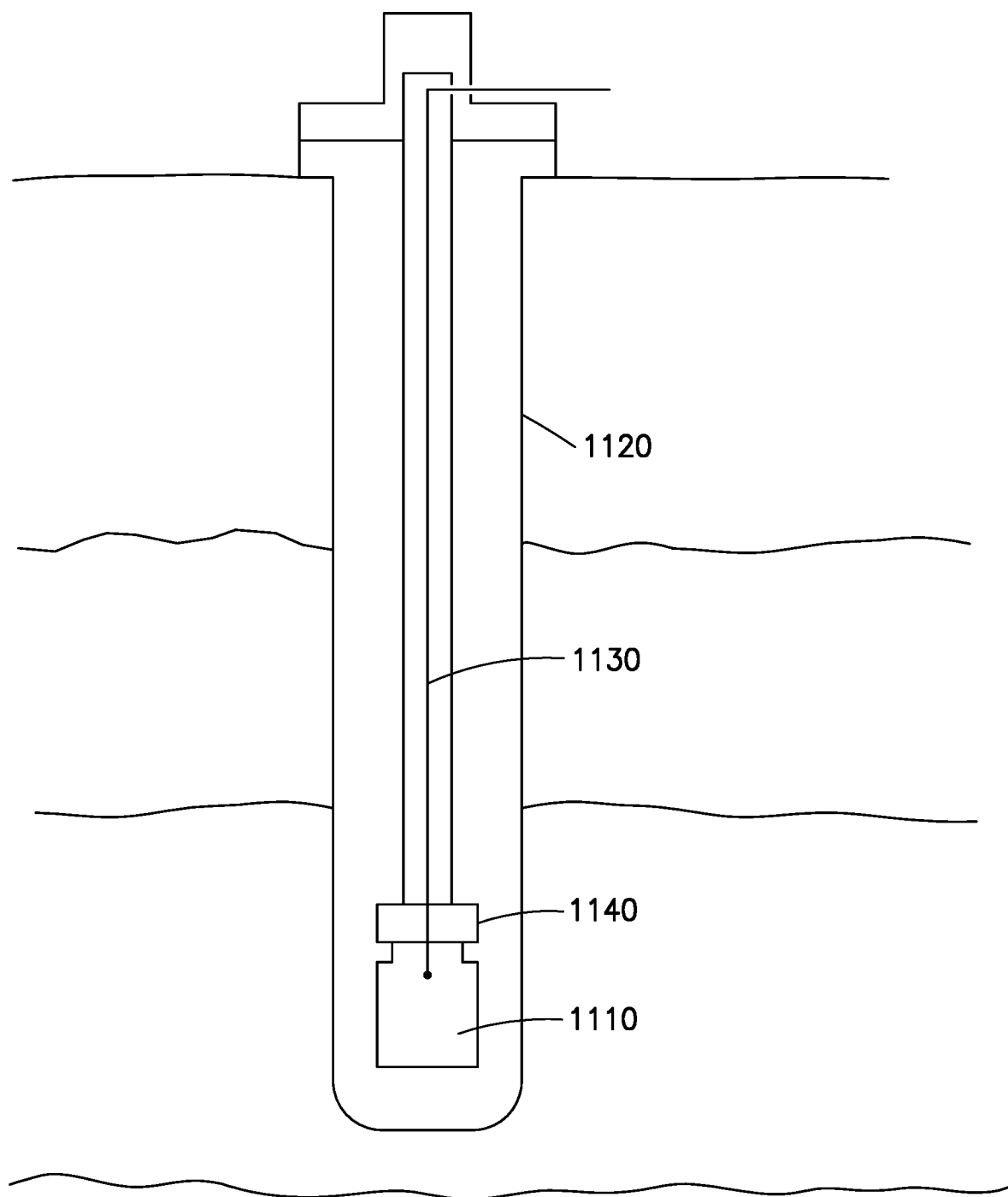
FIG. 11 shows an electric submersible pump in a well with an EMAT flowmeter attached to a pump output which can be used for monitoring long-term flow rate and early warning of a potential pump failure.

In an embodiment, an EMAT Flowmeter may be applied to electric submersible pump diagnostics. Electric submersible pumps are used in secondary oil recovery when the primary drive, either a gas cap or water drive, has been depleted. FIG. 11 shows a basic electric submersible pump (ESP) 1110 installed within a vertical well 1120. The pump is positioned near a producing reservoir zone and is connected to the surface for power and data exchange by an electric line 1130. Over time and use, ESPs are known to fail with little or no warning, resulting in lost oil production until the ESP can be removed and a replacement installed. In an embodiment, an EMAT flowmeter 1140 is attached to the fluid tube connected to the output side of the ESP. The flowmeter 1140 provides a robust and reliable downhole diagnostic of the pump performance and a warning of imminent pump failure.

In an embodiment, a downhole flowmeter for oil and gas wells comprising two or more EMAT rings coupled to the outer diameter of the production tube and near the reservoir zone where the oil or gas originates is described. The EMAT rings are located at the entry points of water, oil, or gas within complex multi-zone and multilateral horizontal wells.

In an embodiment, the device comprises a simple circular array of permanent magnets, a single, high current wire wound as meander coil(s), a pulsed low voltage, high current drive circuit, and conventional data acquisition and analysis electronics. Coupling of the device to the zonal production tube may require a simple split shell arrangement without any special coupling medium between the coil and the tube.

The permanent magnets and coil of the EMAT device are extremely robust to high shocks that may be encountered during transport to the well site and installation in the well. They are also extremely robust to high temperatures that may be encountered within the well and are immune to aging and other long-term degradation that may affect performance. Since the device is mounted externally to the tube it is shielded from erosion due to sand in the fluid and cavitation in the fluid, scaling due to precipitates in the fluid, and corrosion due to acids in the fluid.

Some of the methods and processes described above, including processes, as listed above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
    flowing a first fluid from a first zone of a first side track well of a mother well through a first completion module disposed in the first zone of the first side track well, the first completion module comprises a first tube and a second tube, wherein the first tube is disposed exterior of the second tube and conducts the first fluid from the first zone into the second tube, the first completion module further comprises a first flow control valve configured to control flow of the first fluid between the first tube and the second tube and a first flowmeter comprising one or more electromagnetic acoustic transducer (EMAT) ring pairs, wherein each of the electromagnetic acoustic transducer (EMAT) ring pairs comprises an electromagnetic acoustic transducer (EMAT) sensor placed around an exterior of the first tube;
    measuring a first travel time of an acoustic wave generated by a first electromagnetic acoustic transducer (EMAT) ring and received by a second electromagnetic acoustic transducer (EMAT) ring of a first electromagnetic acoustic transducer (EMAT) ring pair;
    measuring a second travel time of an acoustic wave generated by a second electromagnetic acoustic transducer (EMAT) ring and received by the first electromagnetic acoustic transducer (EMAT) ring of the first electromagnetic acoustic transducer (EMAT) ring pair; and
    obtaining a first derived flow property of the first fluid from the first zone.

2. The method of claim 1, further comprising:
    using one or more electromagnetic acoustic transducer (EMAT) elements in the one or more electromagnetic acoustic transducer (EMAT) ring pairs in a pulse-echo mode to measure a holdup of the first fluid.

3. The method of claim 2, wherein the holdup and the first derived flow property are used to infer a production volume of the first zone.

4. The method of claim 1, wherein the measuring the first travel time and the second travel time and the obtaining are performed using a second electromagnetic acoustic transducer (EMAT) ring pair located at a distant location on the first tube, and the first derived flow property from the first and the second electromagnetic acoustic transducer (EMAT) ring pairs is correlated to characterize a fluid flow of the first fluid from the first zone.

5. The method of claim 1, further comprising:
    using the first derived flow property to make a reservoir management decision.

6. The method of claim 5, further comprising:
    using the first flow control valve to make a reservoir management decision.

7. The method of claim 1, further comprising:
    obtaining a second derived flow property of a second fluid from a second zone of the first side track well using a second flowmeter of a second completion module disposed in the second zone of the first side track well, the second flowmeter comprising one or more electromagnetic acoustic transducer (EMAT) ring pairs.

8. The method of claim 1, further comprising:
    obtaining a second derived flow property of a second fluid from a second zone of a second side track well of the mother well using a second flowmeter of a second completion module disposed in the second zone of the second side track well, the second flowmeter comprising one or more electromagnetic acoustic transducer (EMAT) ring pairs.

9. The method of claim 1, wherein the first flow control valve and the first flowmeter are disposed exterior of the second tube, each electromagnetic acoustic transducer (EMAT) sensor comprising at least one coil and at least one permanent magnet, and each electromagnetic acoustic transducer (EMAT) sensor being disposed on an outer surface of the first tube such that the at least one coil is disposed between the outer surface of the first tube and the at least one permanent magnet.

* * * * *